United States Patent
Forbes et al.

(10) Patent No.: US 12,045,896 B2
(45) Date of Patent: Jul. 23, 2024

(54) AUTOMATED TIME ENTRIES UTILIZING AUTOMATED TIME CAPTURE

(71) Applicant: Centerbase, LLC, Dallas, TX (US)

(72) Inventors: John Brian Forbes, Dallas, TX (US); Robert Matthew Joyner, Dallas, TX (US)

(73) Assignee: CENTERBASE, LLC, Dallas, TX (US)

( * ) Notice: Subject to any disclaimer, the term of this patent is extended or adjusted under 35 U.S.C. 154(b) by 188 days.

(21) Appl. No.: 17/702,572

(22) Filed: Mar. 23, 2022

(65) Prior Publication Data

US 2023/0306528 A1  Sep. 28, 2023

(51) Int. Cl.
*G06Q 40/12* (2023.01)
(52) U.S. Cl.
CPC .................. *G06Q 40/125* (2013.12)
(58) Field of Classification Search
CPC .................................................. G06Q 40/125
See application file for complete search history.

(56) References Cited

U.S. PATENT DOCUMENTS

| | | | |
|---|---|---|---|
| 2013/0297468 A1* | 11/2013 | Hirsch | G06Q 10/109 705/32 |
| 2017/0169520 A1* | 6/2017 | Cornet | G06Q 40/125 |

* cited by examiner

*Primary Examiner* — Paul Danneman
(74) *Attorney, Agent, or Firm* — James R. Gourley; Carstens, Allen & Gourley, LLP

(57) ABSTRACT

Apparatus and methods for generating automated time entries utilizing automated time capture. In an exemplary method, a duration of a communication session between a timekeeper operating a first communication device and a client operating a second communication device is determined in response to a termination of the communication session. The duration is determined by automated time capture without further input from the timekeeper. An automated time entry is generated upon termination of the communication session. The automated time entry identifies the timekeeper, the client, a date of the communication session, and the duration. A list of automated time entries is generated for review by the timekeeper. The list of automated time entries is provided to the timekeeper on one or more computing devices that includes the first communication device.

20 Claims, 10 Drawing Sheets

Time Entry

Selected Email(s): ☐ Attach Selected Emails
/o=ExchangeLabs/ou=Exchange Administrative Group (FYDI...

File Path: Matters/Aaron Appleberry v State - 244.0004

| Name |
|---|
| ⊟ 📁 Aaron Appleberry v State |
| ⊞ 📁 Attorney Notes |
| ⊞ 📁 Client Files |
| ⊞ 📁 Correspondence |
| ⊞ 📁 Depositions |
| ⊞ 📁 Discovery |
| ⊞ 📁 Drafts |
| ⊞ 📁 Emails |
| ⊞ 📁 Exhibits |
| 📁 Fee Agreement |

| Name | Type |
|---|---|
| 📁 Attorney Notes | folder |
| 📁 Client Files | folder |
| 📁 Correspondence | folder |
| 📁 Depositions | folder |
| 📁 Discovery | folder |
| 📁 Drafts | folder |
| 📁 Emails | folder |
| 📁 Exhibits | folder |
| 📁 Fee Agreement | folder |

Linked to

Matter ▼ | Matters/Aaron Appleberry v State - 244.0004 ▼

904

☑ Add Billing Entry

Billing Information

User*: Cole Martin ▼

Code: Email Correspondence ▼

Description: Email Correspondence

Total: $41.00    Billable Total: $41.00

910

Rate*: 410.00    Worked hours: 0.10    908    Billable hours: 0.10    Flat Rate: ☐ Is flat rate?    Non-Billable: ☐ Is non-billable?

902    906

Thursday, December 2, 2021 ▼

OK    Cancel

AUTOMATED TIME ENTRIES UTILIZING AUTOMATED TIME CAPTURE

BACKGROUND

Technical Field

Novel aspects of the present disclosure relate to time management, and more particularly to apparatuses and corresponding methods for autonomously generating billable time entries based on billable events having durations that can be determined by automated time capture, i.e., without further user input.

Background

Service providers that charge clients at hourly rates are referred to herein as "timekeepers". Non-limiting examples of timekeepers include attorneys, web developers, and independent mechanics; however, examples described herein will be limited to attorney timekeepers for the sake of simplicity. Attorneys can keep track of their billable time using any one of a number of conventional solutions. For example, some attorneys prefer to write down their time on a sheet of paper for subsequent entry into a billing software program by a legal assistant. The legal assistant generates the billable time entry that is ultimately invoiced to the client. Other attorneys may prefer to manually create a billable time entry by editing the fields of a spreadsheet that can be uploaded to the billing software program, or the attorneys may prefer to create the billable time entry by entering the requisite information directly into the billing software program. Still other attorneys may prefer to use some form of software app with an integrated timer and a text field that can be used to capture the time and description of the billable entry. The resultant billable entry can then be referenced by the attorney or legal assistant for generating the billable time entry.

Many billable tasks include communications that are often overlooked by the timekeeper for a number of different reasons and thus not converted into billable time entries that are subsequently invoiced to the client. A significant amount of lost revenue remains uncaptured.

SUMMARY OF THE INVENTION

Novel aspects of the present disclosure are directed to a method for automated time capture utilizing automated time capture. In an exemplary method, a duration of a communication session between a timekeeper operating a first communication device and a client operating a second communication device is determined in response to a termination of the communication session. The duration is determined by automated time capture without further input from the timekeeper. An automated time entry is generated upon termination of the communication session. The automated time entry identifies the timekeeper, the client, a date of the communication session, and the duration. A list of automated time entries is generated for review by the timekeeper. The list of automated time entries is provided to the timekeeper on one or more computing devices that includes the first communication device Novel aspects of the present disclosure are also directed to an apparatus for automated time capture utilizing automated time capture. The apparatus includes a communications interface that receives data from a network. The apparatus also includes memory storing instructions for generating the automated time entries based on a communication session between a timekeeper operating a first communication device and a client operating a second communication device. The communications interface and the memory are communicatively coupled to a processor that executes instructions stored in memory to determine, in response to a termination of the communication session, a duration of the communication session by automated time capture without further input from the timekeeper. The processor also executes the instructions to generate an automated time entry upon termination of the communication session. The automated time entry identifies the timekeeper, the client, a date of the communication session, and the duration. The processor also executes the instructions to generate a list of billable time entries for review by the timekeeper. The list of billable time entries is provided to the timekeeper on one or more computing devices that includes the first communication device Novel aspects of the present disclosure are also directed to another method for generating automated time entries utilizing automated time capture. The method includes providing, to a timekeeper operating a first communication device, a user interface (UI) for establishing a communication session with a client operating a second communication device; receiving, at the user interface, a confirmation to establish the communication session between the first communication device and the second communication device; and exchanging data with the second communication device during the communication session. A duration of the communication session is determined by automated time capture without further input from the timekeeper. The method also includes providing a list of billable time entries for review by the timekeeper. The list includes an automated time entry based on the communication session between the first communication device and the second communication device which identifies the timekeeper, the client, a date, and the duration of the interaction.

Novel aspects of the present disclosure are also directed to a communication device for generating automated time entries utilizing automated time capture. The communication device includes a communications interface that receives data from a network. The apparatus also includes memory storing instructions for generating the automated time entries based on a communication session between a timekeeper operating the communication device and a client operating a second communication device. The communications interface and the memory are communicatively coupled to a processor that executes instructions stored in memory to provide, to the timekeeper operating the communication device, a user interface (UI) for establishing a communication session with a client operating a second communication device; receiving, at the user interface, a confirmation to establish the communication session between the communication device and the second communication device; and exchange data with the second communication device during the communication session. A duration of the communication session is determined by automated time capture without further input from the timekeeper. The processor also executes the instructions stored in the memory to provide a list of billable time entries for review by the timekeeper. The list includes an automated time entry based on the communication session between the communication device and the second communication device which identifies the timekeeper, the client, a date, and the duration of the interaction.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

FIG. 8 is an exemplary windowed interface providing options for modifying fields of an autonomously generated billable time entry utilizing automated time capture according to an illustrative embodiment;

FIG. 9 is an exemplary windowed interface providing options for providing rules for autonomously generating billable time entries with automated time capture according to an illustrative embodiment;

FIG. 12 is an exemplary windowed interface depicting call options for establishing a voice call that can be captured via autonomous generation of billable time entries utilizing automated time capture according to an illustrative embodiment;

FIG. 13 is an exemplary user interface presented on a mobile communication device showing an autonomously generated billable time entry utilizing automated time capture according to an illustrative embodiment;

DETAILED DESCRIPTION

For each of the conventional solutions for billable time entry described above, the timekeeper is required to take multiple time-consuming steps to create a billable time entry that can be used to generate an invoice. For example, the attorney who writes down time entries on paper must keep a clock and a ledger nearby and make note of the starting and stopping times of the billable event and provide a description that identifies the client and a summary of the billable event, then convey the ledger to a legal assistant for subsequent entry. For the timekeepers who enter time directly into a third-party software application, the user is required to launch the app, then start and stop a timer to capture an accurate time value, then provide a description of the billable event that at least identifies the client and a summary of the billable event. Timekeepers that enter time into a spreadsheet or directly into a billing software program are required to launch an appropriate software program, then provide an accurate starting time and stopping time of the billable event with reference to a clock, in addition to providing a description that identifies the client and a summary of the billable event. Some timekeepers may elect not to prepare a billable time entry because the effort to generate the entry may take more time than the actual billable event.

Other timekeepers who may be inclined to generate a billable time entry for every possible billable event may fail to do so because the conventional means of capturing the billable time entry is not available. For example, a timekeeper responding to a phone call or text message from a client after hours while out on a walk may lack access to the ledger of time entries or may lack access of the spreadsheet or software application used for capturing the time entries. In many cases, these billable events are not entered, which results in decreased revenue.

Novel aspects of this disclosure recognize the need for autonomously generated billable time entries based on billable events having a duration that can be determined by automated time capture. The solution can be mostly transparent to the timekeeper so that the timekeeper is not required to undertake any additional steps to generate a billable time entry, which results in increased revenue without increasing the time or effort needed to capture the billable event. The solution also provides a user interface to allow the timekeeper to review the automatically generated billable time entries and modify the entries as necessary before approving the entries for subsequent invoicing.

Figure 1:
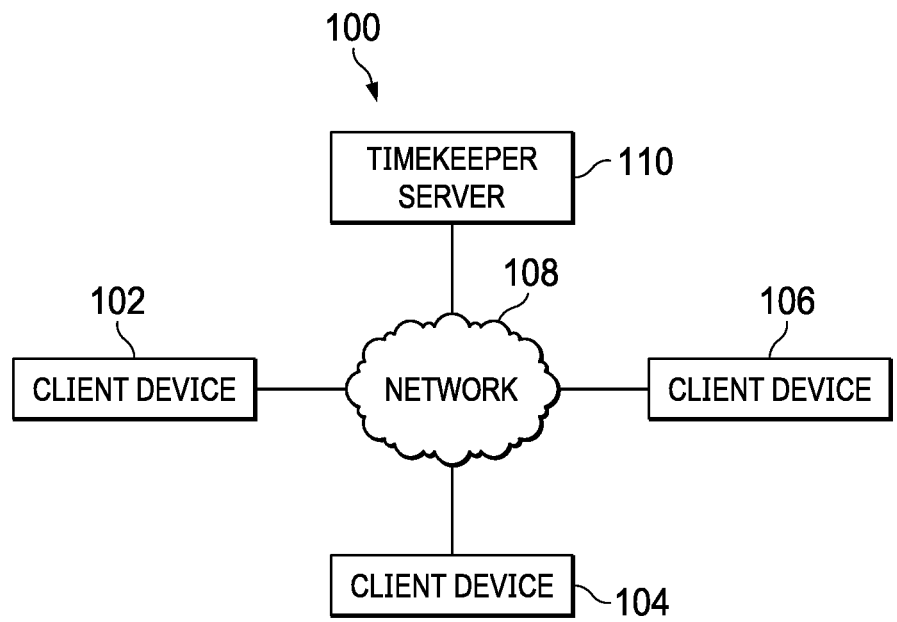
FIG. 1 is a block diagram of a system for generating automated time entries utilizing automated time capture according to an illustrative embodiment.

FIG. 1 is a block diagram of a system for generating automated time entries utilizing automated time capture according to an illustrative embodiment. Generally, the system 100 includes a plurality of electronic devices 102, 104, and 106 communicating via a network 108 to allow one or more users, i.e., timekeepers (not shown), to communicate with one or more clients (not shown) using conventional means. A timekeeper server 110, connected to the network 108, is configured to generate one or more automatically generated time entries based on communications between the timekeeper and the one or more clients conducting communication sessions via one or more of the electronic devices 102, 104, and 106. As used herein, "automatically generated time entries" may also be referred to in the alternative as "automated time entries" for convenience. The automated time entries can be created with a duration that does not require the timekeeper supply additional information, which simplifies the billing process and results in increased revenue. As used herein, the term "automated time capture" means a duration that is determined for an automated time entry without the need for a timekeeper to supply additional information. A list of automated time entries can be provided to the timekeeper for review and/or approval, which eliminates many of the time-consuming steps required for manually capturing a billable event in a billable time entry. In some embodiments, the timekeeper has the option to modify the automated time entries before approval and subsequent invoicing.

Examples of client devices 102, 104, and 106 can include cell phones, tablets, desktop computers, or any other form of communications device, which permit communication via conventional means, such as the exchange of emails, text messages, phone calls, and/or videoconference calls. An example of a client device is shown in more detail in FIG. 2 that follows.

The network 108 can include the internet, the Public Switched Telephone Network (PSTN), cellular networks, and local area networks, among others. Communication over the network 108 can be achieved using various forms of communications equipment and protocols. While client devices 102, 104, and 106 are depicted as communicating through communications links via network 108, in other embodiments, the client devices 102, 104, and 106 can communicate via device-to-device communications protocols. Based on the communications sessions conducted on one or more of the client devices 102, 104, and 106, a timekeeper server 110 connected to the network 108 can generate automated time entries.

Figure 7:
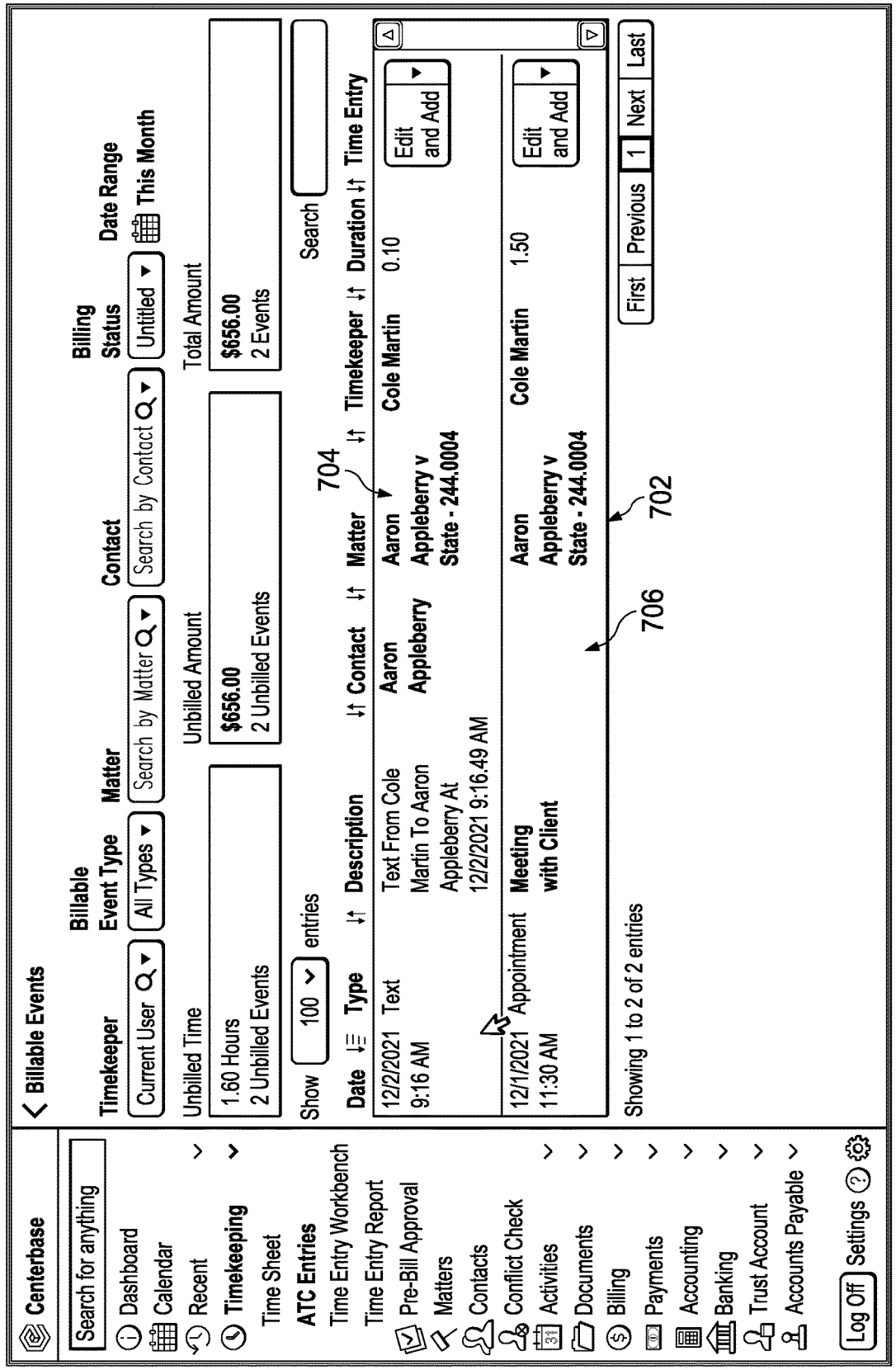
FIG. 7 is an exemplary list of autonomously generated billable time entries utilizing automated time capture according to an illustrative embodiment.

Timekeeper server 110 is a computing device that can include hardware and software configured to generate automated time entries. An example of the timekeeper server 110 shown in more detail in FIG. 3 that follows, and a list of automated time entries is shown in FIG. 7. The billable time entries can be generated based on communication information. Communication information is information used to establish the communications link between the timekeeper and a client, such as a communication identifier of the timekeeper and the client, e.g., telephone numbers, email addresses, or any other form of unique identifier that can be used to route the communication session. The communication information can also include information generated during the communication session, or can include information that is otherwise associated with the communication session. For example, communication information can also include a duration of the communication session as determined by the amount of elapsed time. For example, a voice call or a video call between two parties has a starting time and a stopping time that can be used to calculate a duration of the communication session. Automated time capture can provide a duration value for the automated time entry based on this elapsed time.

The duration of the communication session might also be determined automatically based on predetermined settings. Text messages transmitted between a timekeeper and a client can be assigned with a default duration of 0.1 hours so that each automated time entry that is created for a text message will be billed out at a duration of 0.1 hours. In another example, a duration for a communication session characterized by a series of text messages exchanged during a continuous and uninterrupted exchange can be determined by the total amount of elapsed time between the first and the last text message. An example of a user interface for providing and/or changing the default values for communications sessions is provided in FIG. 9. In another embodiment, a predetermined duration for text messages may be based on a number of characters or a number of words, and/or the manner in which the message was created. A lengthy text message generated by keyboard input may be billed out with a longer predetermined duration relative to a shorter text message. Additionally, a lengthy text message generated by dictation may be billed out with a shorter predetermined duration than a length text message generated by input provided on a keyboard, whether physical or virtual. Thus, automated time capture can be achieved with default values assigned to billable events.

Communications sessions which involve the sending or receiving of emails could be billed based on an amount of elapsed time, a default duration, the number of characters or words, or a hybrid manner taking into account one or more different methodologies of automated time capture.

Communication information can also include a description of the communications session, an identification of the client matter associated with the communications session and a time and date of the communication session. Communication information can include any other form of information that might be included in a client invoice to give the client sufficient context about the communication session to make a subsequent payment on the associated invoice.

Figure 8:
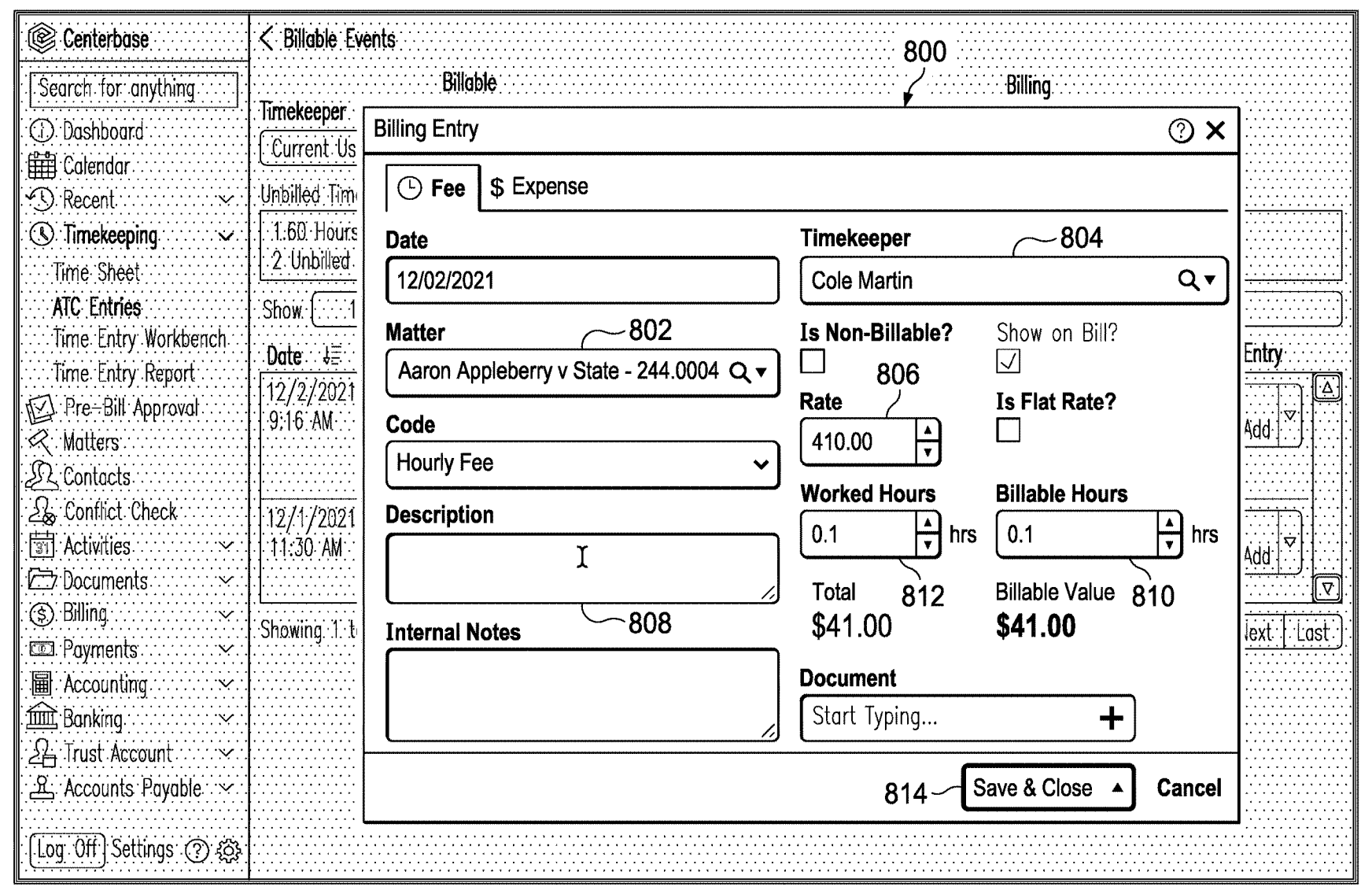

The timekeeper server 110 can use the communication information to automatically generate billable time entries that can then be aggregated and then submitted to the timekeeper in list format for more efficient review and/or approval. Novel aspects of this disclosure allow a timekeeper the ability to review, edit, and/or approve multiple automated time entries at one time, which would effectively allow the timekeeper to submit multiple approved billable time entries for invoicing in the amount of time that previously took to prepare a single billable time entry. An exemplary interface for reviewing and approving an automated time entry is shown in FIG. 8 below.

In an illustrative embodiment, the communication information is obtained by the timekeeper server 110 from communications occurring through native communications applications executing on the timekeeper's communication device, e.g., an email application, a texting application, a videoconferencing application, and a voice calling application. For example, an application program interface (API) passively executing on the timekeeper's communication device can interface with the native communication applications on the communication device to obtain the communication information before, during, and/or after the communication session. According to this embodiment, communications sessions between a timekeeper and a client can be conducted in a conventional manner, via the native communications applications and the communication information can then be received by the API in a manner transparent to the timekeeper and transmitted back to the timekeeper server 110. The communication information can then be used to generate the automated time entries. An example of the data flow according to this embodiment is shown in the swim lane diagram depicted in FIG. 4 that follows.

Figure 3:
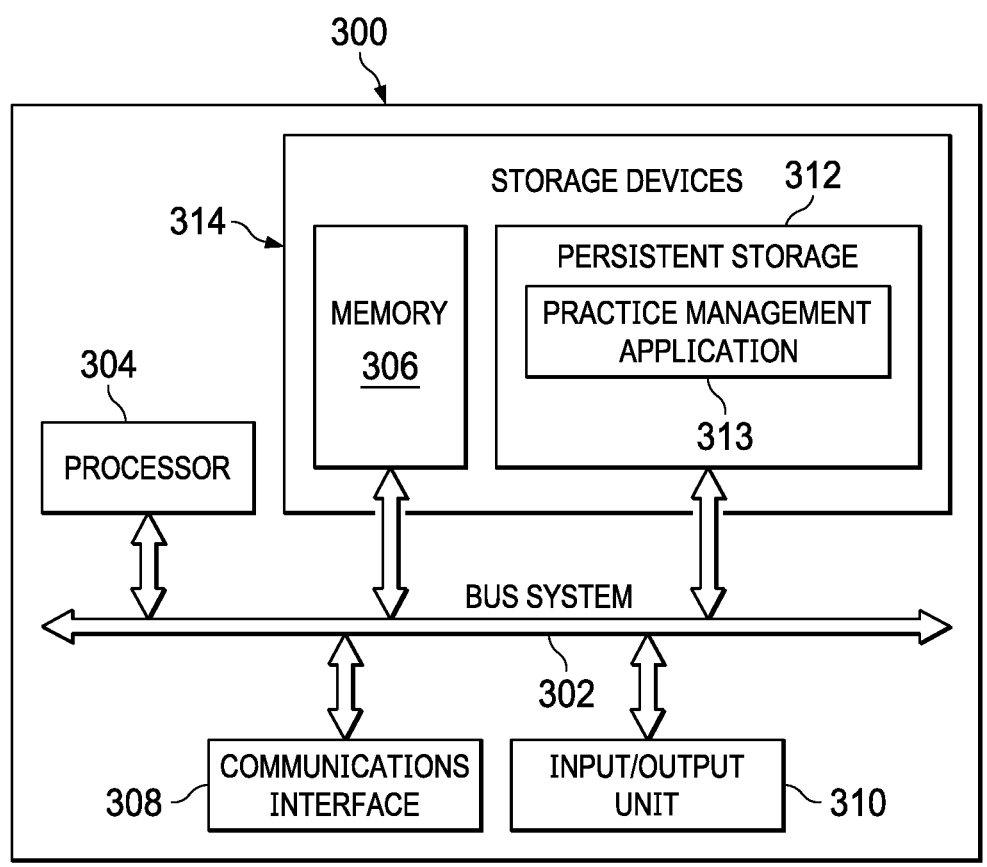
FIG. 3 is a block diagram of a computing device for generating automated time entries utilizing automated time capture according to an illustrative embodiment.

In another illustrative embodiment, the communication information is determined locally at the timekeeper server 110 based communications sessions initiated through a practice management application accessed by a timekeeper operating the communication device. In FIG. 3, the practice management application 313 is hosted at the timekeeper server 110 and accessed by a timekeeper through an internet browser. In another non-limiting embodiment, the practice management application is downloaded to the communication device, e.g., from an app store to allow data processing, storage, and management to occur locally and remotely. Browser-based access is shown in the user interface depicted in FIGS. 6-9. App-based access is shown in the user interface depicted in FIGS. 10-13.

In a non-limiting embodiment, the practice management application is a comprehensive, cloud-based software solution that can be tailored to manage a company's operations. When tailored to a law firm, the practice management solution can manage file management, CRM, client contacts, accounting, communications, and automated time entry utilizing automated time capture, among others. The practice management application can allow a timekeeper to initiate communications sessions by providing a user interface that receives input usable to generate a request transmitted to the timekeeper server 110. The timekeeper server 110 uses information in the request to initiate and/or manage the communication session between the timekeeper and the client, which in turn allows the timekeeper server to identify the communication information usable to generate the automated time entry. The practice management application can interface with native communications apps on the timekeeper's communication device as previously discussed to allow for a bi-directional sync of information so that calendar entries, communication sessions, and modified records can be synchronized. An example of this data flow is shown in the swim lane diagram depicted in FIG. 5 below.

Figure 2:
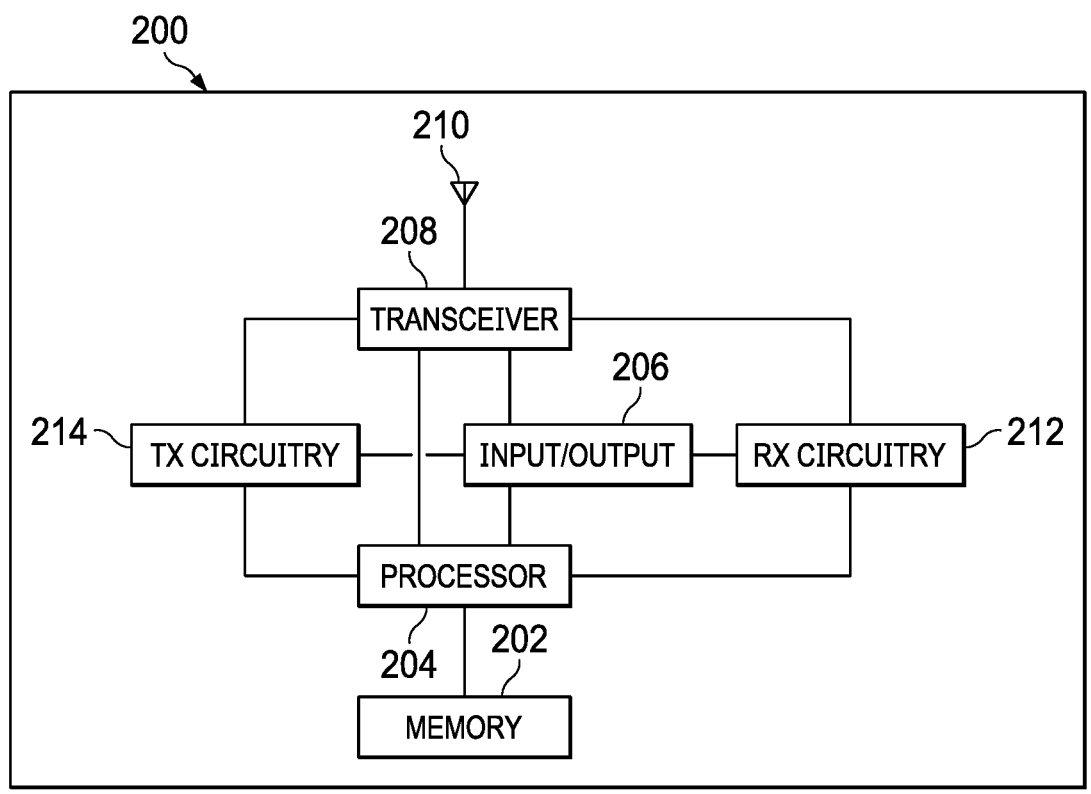
FIG. 2 is a block diagram of a communications device for use in generating automated time entries utilizing automated time capture according to an illustrative embodiment.

FIG. 2 is a block diagram of a communications device for use in generating automated time entries utilizing automated time capture according to an illustrative embodiment. The client device 200 is provided for illustration only. The client devices 104, 106, and 108 in FIG. 1 can have the same or similar configuration as the client device 200 in FIG. 2.

Client device 200 includes memory 202 storing instructions that can be executed by processor 204 for controlling the operation of the client device 200. For example, the memory can store an operating system and one or more applications that can be executed by the processor 204. The memory 202 can include random access memory (RAM), Flash memory, and/or read-only memory (ROM).

I/O 206 is one or more input/output (I/O) devices of the client device 200. Examples of I/O devices include, but are not limited to, a microphone, a speaker, a camera, a touch screen, a keypad. I/O 206 enables a user to interact with the client device 200 to communicate with a client, i.e., via a phone call, text message, email, or videoconference. In some embodiments, I/O 206 also includes I/O interfaces that provide the client device 200 with communications paths with other devices, such as other client devices and peripherals.

The transceiver 208 provides a wireless communications capability with a network, such as network 102 in FIG. 1. Incoming signals are received by the transceiver 208 from the antenna 210 and processed by the receive (RX) circuitry 212, which processes the signal and transmits the processed signal to an I/O device, such as a speaker, if the processed signal is for voice data. The processed signal can also be transmitted to the processor 204 for further processing before presentation to a user on another I/O device, such as a screen, if the processed signal is for other forms of data, such as web browsing data. Outgoing signals transmitted by the transceiver 208 from the antenna 210 are received from transmit (TX) circuitry 214. The TX circuitry 214 can receive voice data from a microphone, or other forms of outgoing data, such as web data, e-mail, or application data, from the processor 204.

The client device 200 in FIG. 2 is depicted as a mobile phone, the client device 200 can be any other conventional client computing devices such as tablets, laptop computers, and desktop computers. For example, the transceiver depicted in the client device 200 can be replaced by a network communications interface that can support wired or wireless communication over a user's home network.

A timekeeper operating the client device 200 can conduct a communication session with a client operating another communication device. The communication session can be initiated at the client device 200 or at the other communication device operated by the client. Communication information based on the communication session can be used by a timekeeper server to generate automated time entries utilizing automated time capture.

FIG. 3 is a block diagram of a computing device for generating automated time entries utilizing automated time capture according to an illustrative embodiment. For example, the server 300 can be an automated timekeeper server 110 in FIG. 1.

Server 300 includes a bus system 302 that supports communication between at least one processor 304, at least one storage device 314, at least one communications interface 308, and at least one input/output (I/O) unit 310.

The memory 306 and a persistent storage 312 are examples of storage devices 314, which represent any structure(s) capable of storing and facilitating retrieval of information (such as data, program code, and/or other suitable information on a temporary or permanent basis). The memory 306 may represent a random access memory or any other suitable volatile or non-volatile storage device(s). The persistent storage 312 may contain one or more components or devices supporting longer-term storage of data, such as a read only memory, hard drive, Flash memory, or optical disc.

The processor 304 may execute instructions that may be loaded into the memory 306. The processor 304 may include any suitable number(s) and type(s) of processors or other devices in any suitable arrangement. Example types of processors 304 include microprocessors, microcontrollers, digital signal processors, field programmable gate arrays, application specific integrated circuits, and discreet circuitry.

The communications interface 308 may support communications with other systems or devices. For example, the communications interface 308 could include a network interface card or a wireless transceiver facilitating communications over the network 102. The communications interface 308 may support communications through any suitable physical or wireless communication link(s).

The I/O unit 310 may allow for input and output of data. For example, the I/O unit 310 may provide a connection for user input through a keyboard, mouse, keypad, touchscreen, or other suitable input device. The I/O unit 310 may also send output to a display, printer, or other suitable output device.

As described in more detail below, the server 300 can be implemented as a timekeeper server in a networked computing system that can automatically generate billing entries based on communications between a user and one or more clients via system 100. In this illustrative embodiment, a practice management application 313 hosted on the server 300 can be used for managing the generation of automated time entries utilizing automated time capture.

Figure 4:
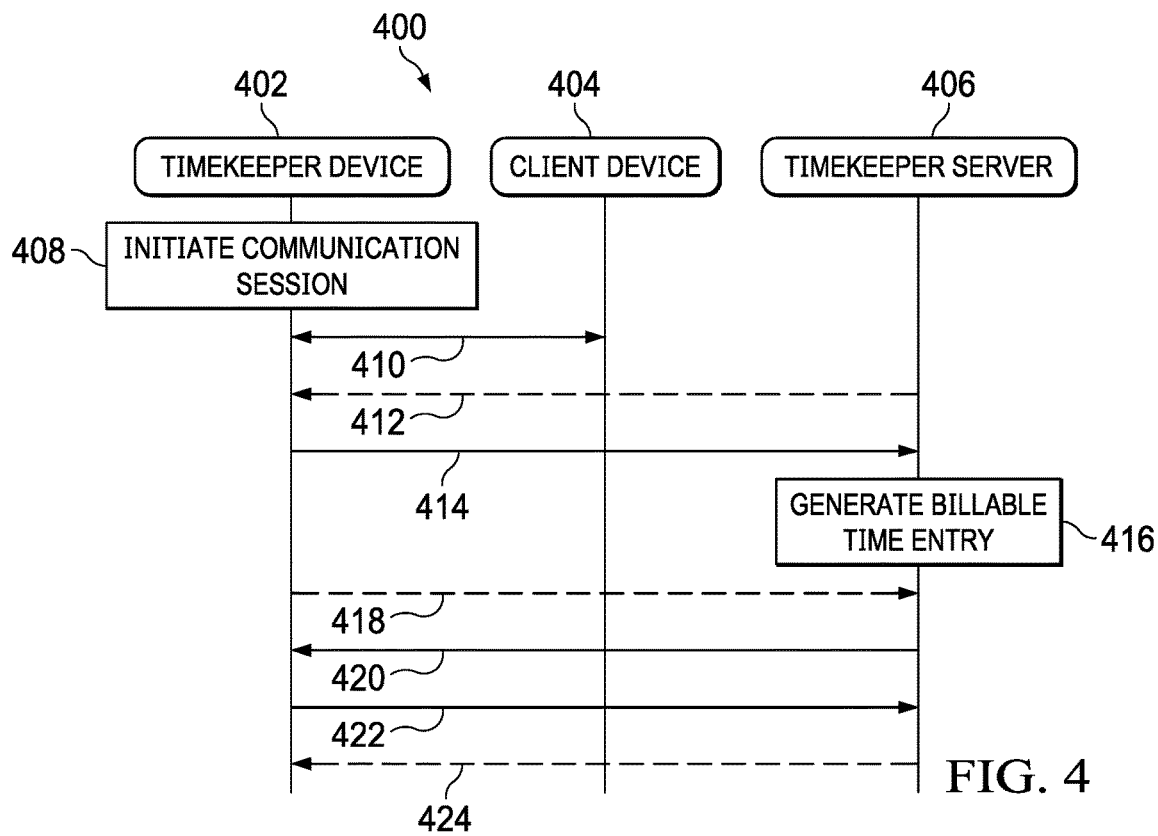
FIG. 4 is a swim lane diagram depicting data flow in a system for generating automated time entries utilizing automated time capture according to an illustrative embodiment.

FIG. 4 is a swim lane diagram depicting data flow in a system for generating automated time entries utilizing automated time capture according to an illustrative embodiment. In particular, the diagram 400 depicts data flow in an embodiment that relies on an API that gathers the communication information from the native communications applications on the timekeeper device 402 and forwards the communication information to the timekeeper server as previously described. In diagram 400, a timekeeper operating timekeeper device 402 is communicating with a client operating client device 404. The timekeeper device 402 and the client device 404 are communication devices such as communication devices 102, 104, and 106 in FIG. 1. Automated time entries are automatically generated by timekeeper server 406, which is a timekeeper server such as timekeeper server 110 in FIG. 1.

In diagram 400, the communication session between the timekeeper device 402 and the client device 404 is initiated at the timekeeper device 402 at step 408. In an alternate embodiment, the communication session can also be initiated by the client device 404. The communication session can be a phone call, a videoconferencing call, an exchange of one or more text messages, or an exchange of one or more emails, and the communication session can be initiated according to any one or more conventional steps and/or protocols. In this illustrative example in FIG. 4, the communication session is a voice call that results in the bidirectional flow of data between the timekeeper device 402 and the client device 404 that is initiated by opening the voice calling application and either dialing a number of the client device 404 or selecting a contact corresponding to the client device 404. The call is conducted at step 410 and the communication information is obtained from the voice calling application by the API interfacing with the voice calling application.

In some embodiments, the timekeeper server 406 sends an optional request at step 412 for call information during or after the communication session conducted at step 410, and the timekeeper device 402 can send the call information via the API in step 414 in response to receiving the request. In another embodiment, the timekeeper device 402 automatically sends the communication information to the timekeeper server via the API in step 414 without receiving a request for the communication information from the timekeeper server 406.

In step 416 the billable time entry is generated by the timekeeper server 406. The billable time entry can include at least some of the communication information, as well as any additional fields selected by the timekeeper, such as client matter and matter description. In one embodiment, the timekeeper server 406 waits to receive a request for reviewing automatically generated billable time entries in step 418 before sending the requested billable time entries in step 420. However, in another embodiment, the timekeeper server 406 sends the billable time entries to the timekeeper device 402 in step 422 without first receiving the request. Thereafter, a response is sent from the timekeeper device 402 to the timekeeper server 406 which can include modifications to the billable time entries and/or approval to finalize the entry for invoicing. In some embodiments, the timekeeper server 406 may send an optional acknowledgment back to the timekeeper device 402 in step 424.

In this illustrative embodiment, the billable time entry is returned back to the timekeeper device 402. However, in another embodiment, the billable time entry can be returned to another one of the timekeeper's communications devices, such as a desktop computer, or the billable time entry can be returned to each of the timekeeper's communications devices.

Figure 5:
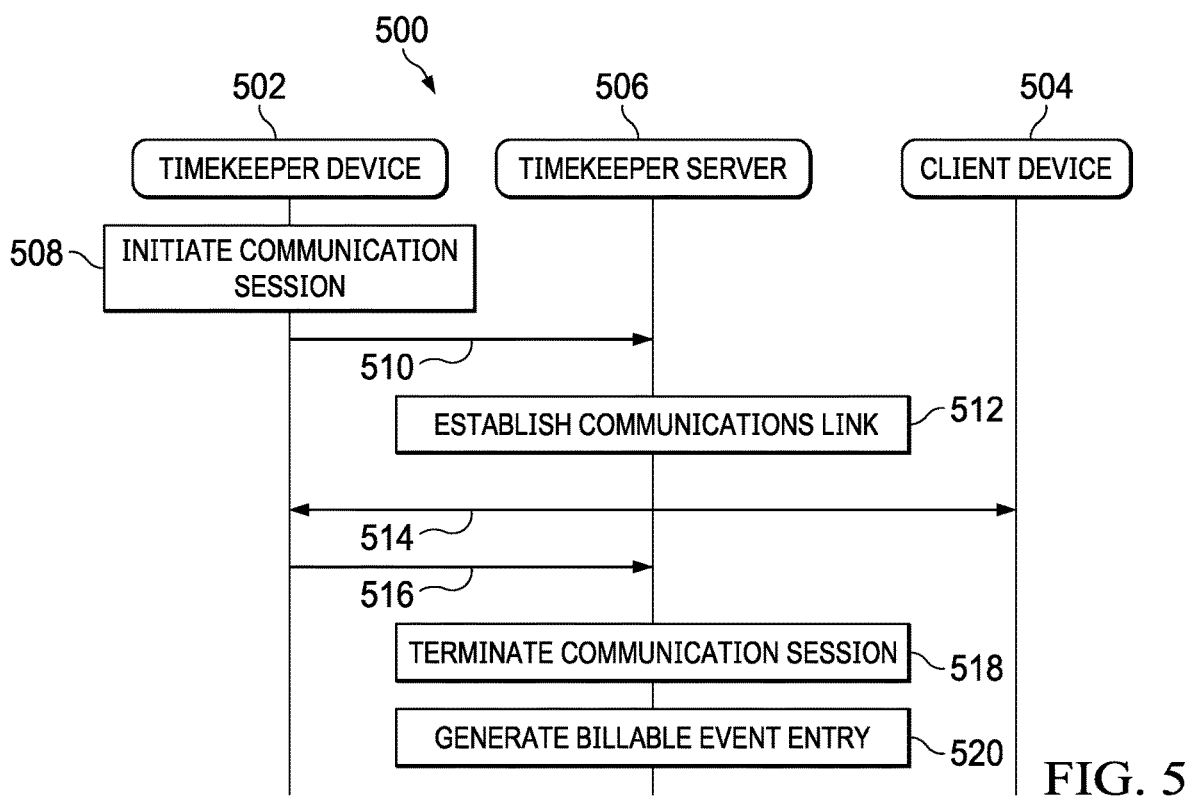
FIG. 5 is a swim lane diagram depicting data flow in a system for generating automated time entries utilizing automated time capture according to another illustrative embodiment.

FIG. 5 is a swim lane diagram depicting data flow in a system for generating automated time entries utilizing automated time capture according to another illustrative embodiment. In particular, the diagram 500 depicts data flow in an embodiment where communications sessions are initiated from a practice management application to allow communication between timekeeper device 502 and client device 504. The timekeeper device 502 and the client device 504 are communication devices such as communication devices 102, 104, and 106 in FIG. 1. Automated time entries are generated by timekeeper server 506, which is a timekeeper server such as timekeeper server 110 in FIG. 1.

In diagram 500, the communication session between the timekeeper device 502 and the client device 504 is initiated on a practice management application on the timekeeper device 502 at step 508. In one embodiment, the communication session can be initiated by opening the practice management application and then navigating to a client contact stored locally or remotely, and then selecting a desired type of communication session, e.g., email, cell phone, video conference call, or text message. In another embodiment, the timekeeper initiating the call provides a communication identifier, e.g., a cellphone number or email address, corresponding to the client device 504.

In another embodiment, the communication session can also be initiated by the client device 504 and routed through the timekeeper server 506. As before, the communication session can be a phone call, a videoconferencing call, an exchange of one or more text messages, or an exchange of one or more emails, and the communication session can be initiated according to any one or more conventional protocols. Communications sessions originating from the client are routed to the timekeeper server 506 for connection to the timekeeper device 502.

In this illustrative embodiment in FIG. 5, the data flow in diagram 500 corresponds to a voice call between the timekeeper device 502 and the client device 504. The communication identifier is a phone number that can be manually entered by the timekeeper or selected from a contact list.

After call initiation, the call initiation request is transmitted from the timekeeper device 502 to the timekeeper server 506 in step 510. Using the communication information in the call initiation request, the timekeeper server 506 can establish the communications link in step 512 necessary for the transfer of voice data in step 514. The communications link can be established using conventional protocols, e.g., a session initiation protocol (SIP) for IP-based telephony applications.

The call can be terminated by either the timekeeper operating the timekeeper device 502 or by the client operating the client device 504, but in this illustrative example, the call is terminated by the timekeeper device 502 in step 516. The timekeeper server 506 terminates the call in step 518 or facilitates termination of the call in step 518 forwarding call termination messages between the timekeeper device 502 and the client device 504. Thereafter, the timekeeper server 506 generates the billable time entry in step 520 based on the call information that is identified sometime during call setup, during the exchange of data between the communication devices, and during call termination. Although not shown, one or more additional steps may follow for transmitting the billable time entry to the timekeeper for modification and/or authorization, as described in more detail in FIG. 4, but which is omitted here for the sake of brevity.

Figure 6:
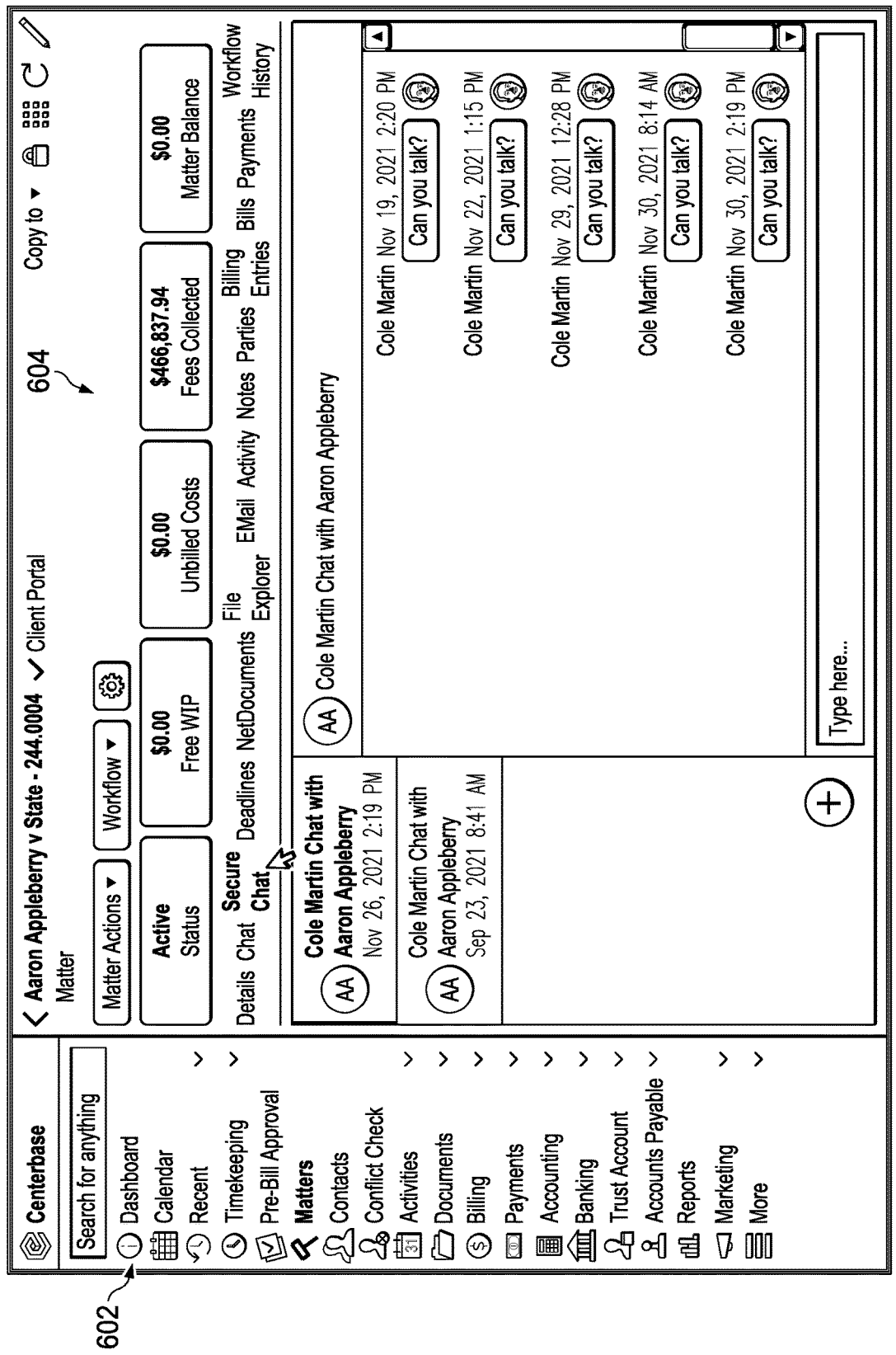
FIG. 6 is an exemplary user interface of a practice management application for generating automated time entries utilizing automated time capture according to an illustrative embodiment.

FIG. 6 is an exemplary user interface of a practice management application for generating automated time entries utilizing automated time capture according to an illustrative embodiment. The practice management application can be downloaded to a computing device, such as client devices 102, 104, and 106 in FIG. 1. In this illustrative embodiment, the computing device is a desktop computer and the practice management application is accessed from a timekeeper server via an Internet browser. Further, the communication session in FIG. 6 is an exchange of text messages between a timekeeper and a client that is managed by the practice management application executing on a timekeeper server, such as timekeeper server 110 in FIG. 1.

The exemplary user interface 600 includes a navigation menu 602 extending a vertical edge of the display. Selection of the MATTERS menu item navigates to a list of one or more matters associated with the Timekeeper named Cole Martin. Selection of a particular matter name, such "Aaron Appleberry v. State" pulls up a dashboard 604 and selection of the SECURE CHAT option brings up a chat functionality that enables the timekeeper to exchange texts with the client. In this illustrative embodiment, a secure chat initiated from a particular matter name provides the timekeeper server with communication information that can be used to generate automated time entries, e.g., the timekeeper, the client, the matter (e.g., Aaron Appleberry v. State), and the date. Automated time capture can be used to determine the duration of the communication session according to one or more of the methods previously described, e.g., by determining an amount of elapsed time, by assigning a default predetermined value, by assigning a value based on a length of the communication, among others. An exemplary billable time entry that is automatically generated by the timekeeper server is shown in FIG. 8.

FIG. 7 is an exemplary list of autonomously generated billable time entries utilizing automated time capture according to an illustrative embodiment. The list of billable time entries 702 can be viewed in response to navigating to the TIMEKEEPER menu item on the menu 602 and by selecting the automated time capture (ATC) Entries menu item, which brings up the dashboard 700 that includes the list of billable time entries 702. As can be seen, the automated time entries generated based on the text message that was sent in FIG. 6 is included in the list of billable time entries 702 as billable time entry 704. The automated time entry includes the communication information obtained from the communication session, namely the date, the type of communication session (i.e., text), the client contact (i.e., Aaron Appleberry), the matter number (i.e., Aaron Appleberry vs. State), the timekeeper (i.e., Cole Martin), and the duration of the communication session. In some embodiments, the Description provided in the billable time entry can be generated based on rules selected by a timekeeper at an options screen that is described in more detail in FIG. 9.

In the list of billable event entries, the timekeeper can select the drop-down menu in the TIME ENTRY column to edit the time entry and/or add the billable time entry to approve billable time entries or exclude the billable time entry. Selecting EDIT brings up the popup window described in more detail in FIG. 8 that follows.

FIG. 8 is an exemplary windowed interface providing options for modifying fields of an autonomously generated billable time entry utilizing automated time capture according to an illustrative embodiment. In the automated time entry 800 depicted in the windowed interface, fields of the billable time entry that can be modified are shown with a visual dropdown indicator.

In one embodiment, the matter field 802 is automatically populated based on the prior selection of the "Aaron Appleberry v. State" matter before initiating the communication session. In another embodiment where the communication session is initiated in a manner that prevents the timekeeper server from being able to identify the matter, e.g., by dialing the client's phone number from a keypad, the autonomously generated billable time entry may leave the matter field 802 blank. The timekeeper can then supply the missing information before the autonomously generated billable time entry is approved and submitted. In yet another embodiment, a timekeeper can select a rule to cause the matter field 802 to be populated with the most recently referenced client matter. In some embodiments, the timekeeper server can populate the matter field 802 based on the identity of the participating party, as determined by unique contact identifier (e.g., a phone number or email address), or the matter field 802 could be populated based on the substance of the message(s) exchanged during the communication session. For example, a text message to an unknown number asking if the recipient could discuss the Aaron Appleberry matter could cause the timekeeper server to identify this communication session with the Aaron Appleberry v. State matter.

The identity of the timekeeper can also be changed by selecting the dropdown menu in the timekeeper field 804. For example, another timekeeper using Cole Martin's communication device could reassign the billable time entry for proper attribution. Likewise, the timekeeper's rate can be modified by changing the value in the rate field 806.

In this illustrative embodiment, the timekeeper has elected not to provide a default description for the autonomously generated billable time entry, as indicated by the blank description field 808. The default description could be provided as one of a number of default settings, as described in more detail in FIG. 9. In this example, the timekeeper would need to provide the missing description via dictation or keyboard entry before submission.

This exemplary automated time entry 800 assigns a default number of billable hours to the corresponding communication, i.e., the text message, and a default number of worked hours, as can be seen by the 0.1-hour value in the Billable Hours field 810 and the 0.1-hour value in the Worked Hours field 812. The default number of worked hours and default number of billed hours can be provided as a default setting, as described in more detail in FIG. 9. For communications that might have taken longer than anticipated, the timekeeper can increase the number of worked hours and the number of billed hours by providing revised values in the appropriate text fields. Discounts can be offered to the client by providing a lower value in the Billable Hours field 810 than in the Worked Hours field 812.

Once the necessary edits have been entered, the timekeeper can submit the autonomously generated time entry by selecting the SAVE AND CLOSE UI element 814. Once saved, or if added without first editing, the autonomously generated time entry is removed from the list of autonomously generated time entries.

Returning to the list of autonomously generated time entries depicted in FIG. 7, the automated time entry 706 is identified as an "Appointment" type of entry, which can be created based on an appointment scheduled in an electronic calendar. The automated time entry 706 can have a duration that is determined by the length of the appointment as determined by the participant who created the calendar entry. The duration of the automated time entry 706 can be modified, manually or automatically, based on the actual duration of the meeting. The duration can be modified manually as previously described. The duration can be modified automatically if the scheduled meeting is conducted in a manner that keeps track of time, e.g., a voice call or a videoconferencing call.

FIG. 9 is an exemplary windowed interface providing options for providing rules for autonomously generating billable time entries with automated time capture according to an illustrative embodiment. In particular, the windowed interface 900 enables a timekeeper to provide default settings to control the manner in which an autonomously generated billable time entry assigns a default duration to emails generated for a particular client matter for automated time capture.

In the rate field 902, the timekeeper can provide the applicable billable rate applied to all emails sent for a particular matter identified in the matter field 904. The worked hours field 906 and billable hours field 908 can be populated with values based on user preferences. In this illustrative example in FIG. 9, the settings indicate that each email will be assigned 0.1 worked hours, and that the entirety of the assigned worked hours will be billed based on the billable hours field 908 indicating that 0.1 hours are billable hours. Similar settings could be provided for text messages as well, which may be preferable in the instance where no other means are utilized for determining a duration of the message exchange, as previously described. While these default settings could also be applied to voice calls and video calls, those forms of communication are already timed, which provide an easy manner for determining a duration of those communications sessions.

In the description field 910, the timekeeper can provide a default description that is applied to the automated billing entries generated according to these rules. In this example in FIG. 9, the general description applied to all automated billing entries is "Email Correspondence". In other embodiments, the description can include AI-based text derived from the email. For example, the description can be "Email Correspondence regarding: [DESCRIPTION]" where [DESCRIPTION] is derived automatically from an email subject line or from the body of the email. The description can also be generated by incorporating communication information, such as the communication type, the parties to the communication session, and the date and time, as previously shown in FIG. 7.

Figure 10:
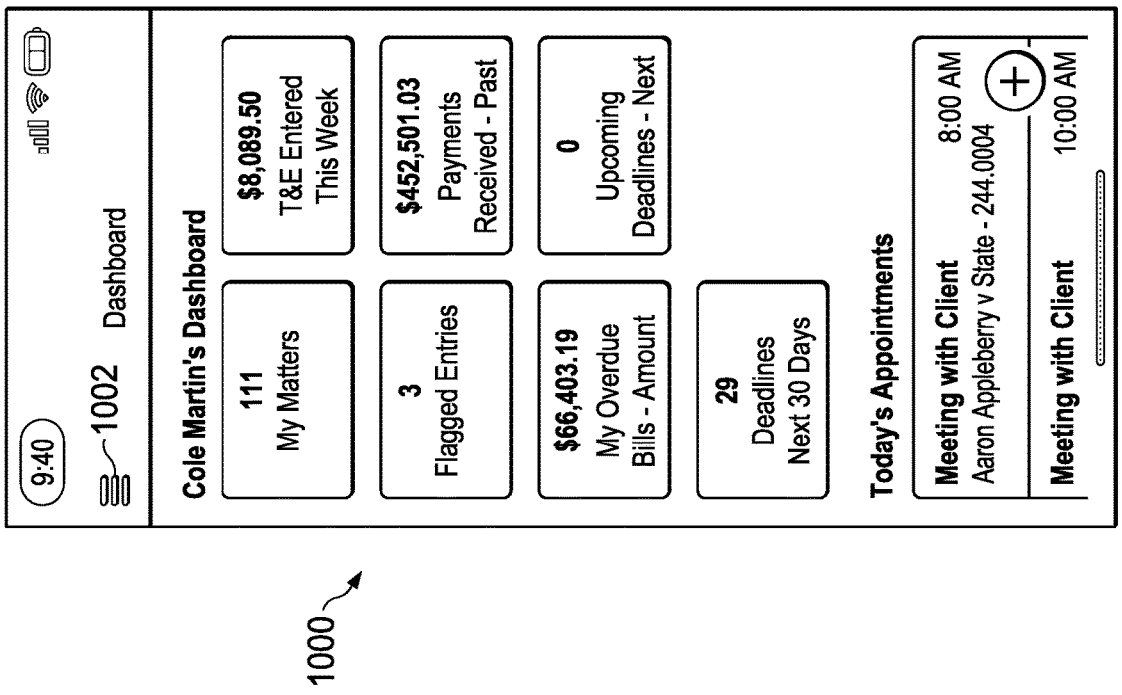
FIG. 10 is an exemplary user interface of a mobile communications device for use in generating automated time entries utilizing automated time capture according to an illustrative embodiment.

FIG. 10 is an exemplary user interface of a mobile communications device for generating automated time entries utilizing automated time capture according to an illustrative embodiment. The user interface depicts a customizable dashboard 1000 presenting some customizable informational tiles. Selection of the menu icon 1002 allows the timekeeper to navigate to one or more screens for initiating a communications session with a client. In one embodiment, the timekeeper can use the menu icon 1002 to navigate to an email application, a voice calling application, a videoconferencing application, or a texting application and then initiate a communication session with a client in ways that are known in the art. In another embodiment, the timekeeper can use the menu icon 1002 to navigate to a list of client contacts that can be stored locally or remotely, and select a communication type from the stored client contact. An example of a stored client contact is depicted in FIG. 11.

Figure 11:
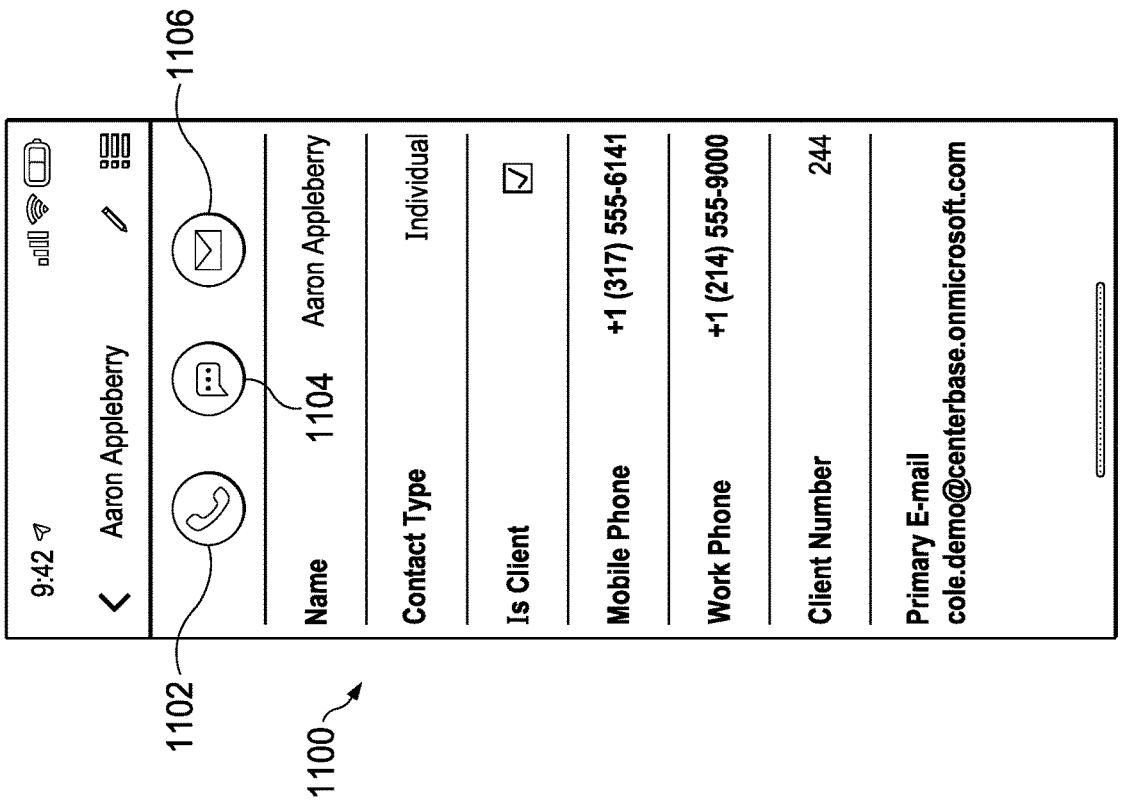
FIG. 11 is an exemplary client contact screen usable for initiating a communications session that can be captured in an autonomously generated billable time entry utilizing automated time capture according to an illustrative embodiment.

FIG. 11 is an exemplary client contact screen usable for initiating a communications session that can be captured in an autonomously generated billable time entry utilizing automated time capture according to an illustrative embodiment. The client contact screen 1100 can include information that is stored locally on a mobile communications device of a timekeeper, such as client device 102 in FIG. 1. Alternatively, the information can be stored remotely on a network accessed storage location and made available to the timekeeper's mobile communications device.

The client contact screen 1100 provides options of the different types of communication that can be initiated by the timekeeper operating the mobile communications device. Selection of the headset icon 1102 can immediately initiate a voice call with the call recipient. In another embodiment, selection of the headset icon 1102 causes a windowed interface to be displayed which provides additional calling options, as described in more detail in FIG. 12 that follows.

Selection of the text bubble icon 1104 can launch up a text message exchange screen showing messages exchanged between the timekeeper and the client. Likewise, selection of the envelope icon 1106 can launch an email that is pre-populated with the email address of the client. Alternatively, selection of the envelope icon 1106 can launch an email application that shows the various emails exchanged between the timekeeper and the client, which would also allow the timekeeper to generate a new email to the client.

Figures 12, 13:
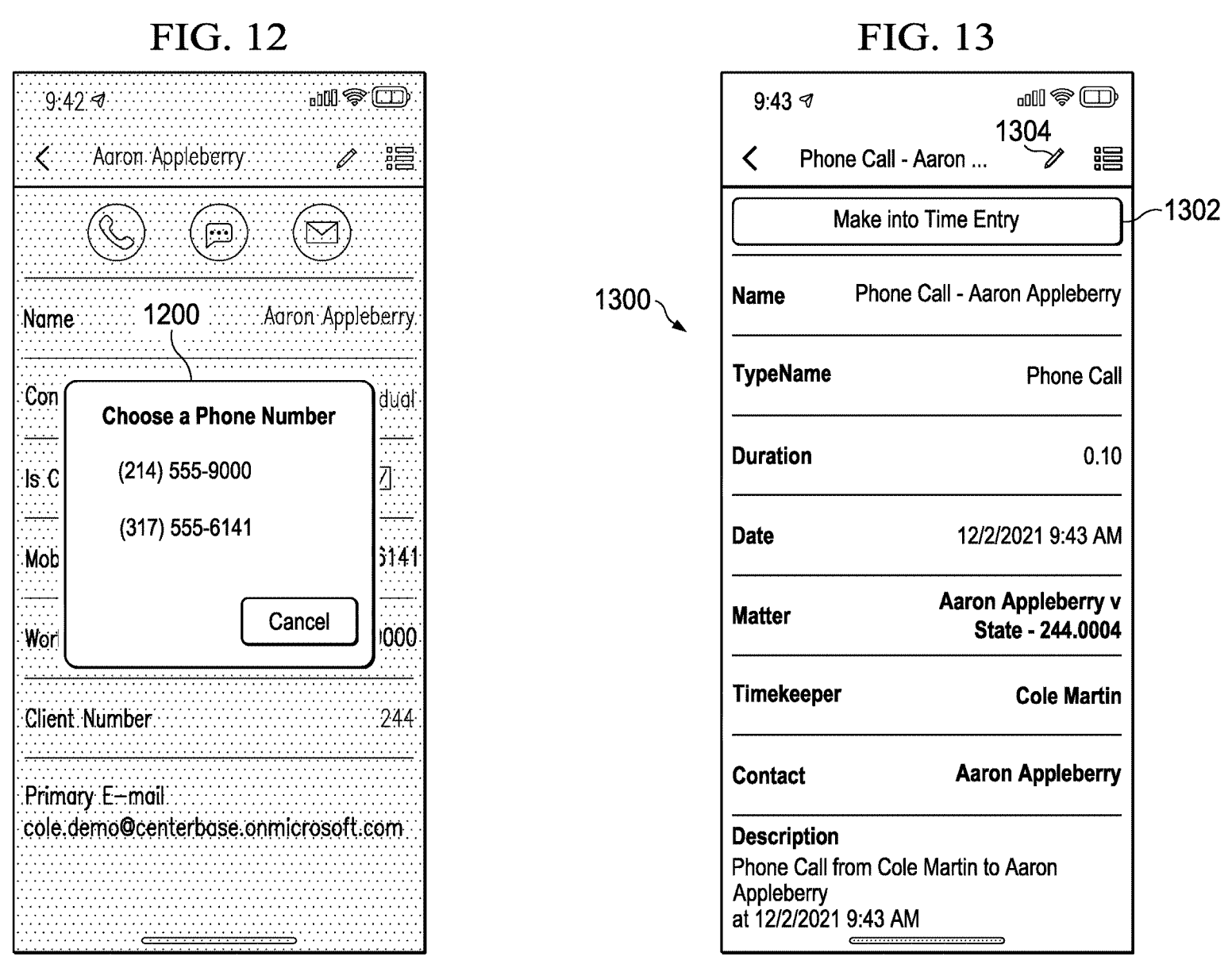

FIG. 12 is an exemplary windowed interface depicting call options for establishing a voice call that can be captured via autonomous generation of billable time entries utilizing automated time capture according to an illustrative embodiment. The windowed interface 1200 can be presented in response to selection of the headset icon 1102 presented in the client contact screen shown in FIG. 11.

In one embodiment where a timekeeper server manages the incoming and outgoing calls for the timekeeper's communications devices, as in the embodiment where communications sessions are exclusively initiated through a practice management application, the windowed interface 1200 gives the timekeeper the option of selecting which number to display to the recipient of the voice call. The first telephone number may correspond to the timekeeper's cell phone number and the second telephone number may correspond to the callback number assigned to the timekeeper by the timekeeper server. Selection of the number assigned to the timekeeper by the timekeeper server can prevent disclosure of the timekeeper's personal phone number to clients.

In another embodiment, the windowed interface 1200 gives the timekeeper the option of selecting the manner in which the voice call is completed. For example, when the first telephone number corresponds to the timekeeper's cell phone number and the second telephone number corresponds to the callback number assigned to the timekeeper by the timekeeper server, selection of the first telephone number causes the call to be completed using the native calling application of the timekeeper's mobile communication device, e.g., the cellular network and associated telecommunication protocols. As previously discussed, communication information usable by a timekeeper server to autonomously generate a billable time entry for this type of call is provided to the timekeeper server by an API interfacing with the native calling application of the timekeeper's mobile communication device. Selection of the second telephone causes the mobile communication device to transmit a voice call request to the timekeeper server for initiation, as previously described.

FIG. 13 is an exemplary user interface presented on a mobile communication device showing an autonomously generated billable time entry utilizing automated time capture according to an illustrative embodiment. The autonomously generated billable event can be provided to one or more mobile communications devices operated by a timekeeper, such as client devices 102, 104, or 106 in FIG. 1.

The billable time entry 1300 depicted in FIG. 13 includes the same fields as described above with respect to FIG. 8 and will not be discussed in further detail here for the sake of brevity. If the fields in the billable time entry 1300 are acceptable, then the timekeeper can submit the billable time entry 1300 by pressing the button icon 1302, identified by the text "Make into Time Entry". If the timekeeper elects to modify one or more of the fields in the billable time entry 1300, selection of the pencil icon 1304 will allow the timekeeper to select the appropriate field for edit. Editing the fields in the billable time entry 1300 will generally follow the same procedure described above with respect to FIG. 8.

Figure 14:
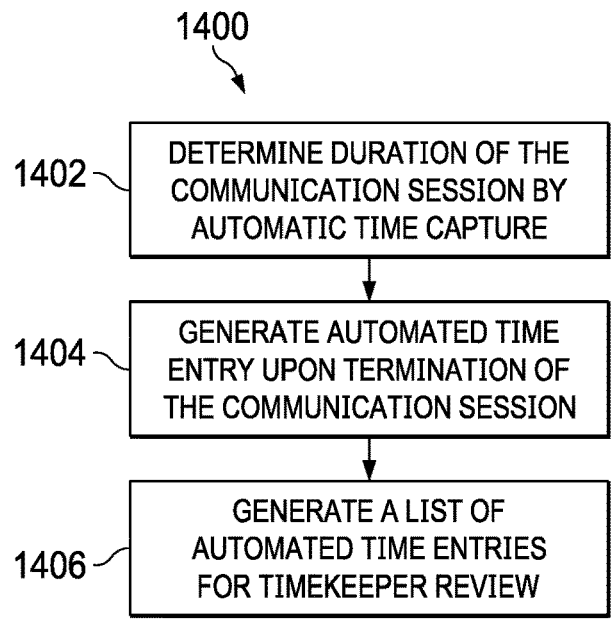
FIG. 14 is a flowchart of process for generating automated time entries utilizing automated time capture according to an illustrative embodiment.

FIG. 14 is a flowchart of process for generating automated time entries utilizing automated time capture according to an illustrative embodiment. The process can be implemented in a server, such as timekeeper server 110 in FIG. 1.

Flowchart 1400 begins at step 1402 by determining a duration of the communication session by automated time capture without further input from the timekeeper. The duration can be determined in response to a termination of a communication session between a timekeeper operating a first communication device and a client operating a second communication device. In one embodiment, the duration of the communication session is determined by an amount of time elapsed during the communication session. In another embodiment, the duration of the communication session is determined by a predetermined amount of time assigned based on the type of the communication session.

In step 1404, an automated time entry is generated upon termination of the communication session. The automated time entry can identify the timekeeper, the client, a date of the communication session, and the duration. A non-limiting example of an automated time entry is shown and described in more detail in FIG. 8 above.

In step 1406, a list of automated time entries is generated for review by the timekeeper. The list of automated time entries is provided to the timekeeper on one or more computing devices that includes the first communication device.

In some embodiments, the method can include the optional step of receiving, from the first communication device, a request for establishing the communication session between the first communication device and the second communication device. In a non-limiting example, the request can be generated at a practice management application available to the timekeeper on the first communication device. The practice management application can be a downloadable application hosted on the first communication device. The practice management application can also be hosted remotely from the first communication device and the second communication device and accessed via an Internet browser.

In some embodiments, the method can include the optional step of receiving, from the second communication device, a request for establishing the communication session between the first communication device and the second communication device, then forwarding the request to the first communication device for acceptance by the timekeeper. In a non-limiting example, acceptance of the request establishes the communication session.

Figure 15:
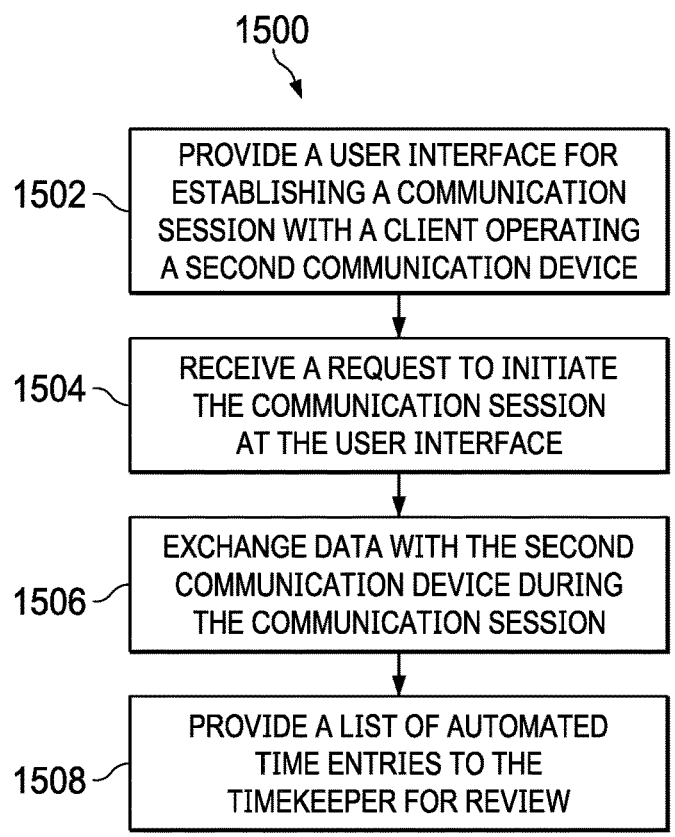
FIG. 15 is a flowchart of process for generating automated time entries utilizing automated time capture according to another illustrative embodiment.

FIG. 15 is a flowchart of process for generating automated time entries utilizing automated time capture according to another illustrative embodiment. The process can be implemented in a communication device operated by a timekeeper, such as client device 102 in FIG. 1.

Flowchart 1500 begins at step 1502 by providing, to a timekeeper operating a first communication device, a user interface (UI) for establishing a communication session with a client operating a second communication device. An example of the UI for establishing the communication session is shown in FIGS. 6 and 11 above.

In step 1504, a request to initiate the communication session between the first communication device and the second communication device is received at the user interface. The request can be received on a practice management application available to the timekeeper on the first communication device. For example, the request to initiate the communication session can be dialing a telephone number on the practice management application, or selecting a stored client contact and then selecting a desired type of communication, e.g., voice call, text message, or email. In another example, the request to initiate the communication session can be accepting a call originating at the second communication device.

The request can be received on a practice management application available to the timekeeper on the first communication device. The practice management application can be a downloadable application hosted on the first communication device. The practice management application can also be hosted remotely from the first communication device and the second communication device and accessed via an Internet browser.

In step 1506, data is exchanged with the second communication device during the communication session. The duration of the communication session is determined by automated time capture without further input from the timekeeper. In some embodiments, the data exchanged between the first communication device and the second communication device is passed through a timekeeper server. In other embodiments, the data exchanged passes through the network without passing through the timekeeper server, e.g., VOIP calls that may be set up by the timekeeper server but which does not actively participate in data exchange.

In step 1508 a list of billable time entries is provided for review by the timekeeper. The list includes an automated time entry based on the communication session between the first communication device and the second communication device, and the automated time entry identifies the timekeeper, the client, a date, and the duration of the interaction.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for generating automated time entries utilizing automated time capture, the method comprising:
    receiving, at a user interface executing on a first communication device, a request from a timekeeper to initiate a communication session between the first communication device and a second communication device;
    receiving, at a timekeeper server communicatively coupled to the first communication device, the request to initiate a communication session, wherein the request comprises identification information associated with the second communication device;
    responsive to a termination of the communication session between the timekeeper operating the first communication device and a client operating the second communication device, determining, by the user interface, a duration of the communication session by automated time capture without further input from the timekeeper;
    receiving, at the timekeeper server from the user interface, information regarding the communication session, including the duration of the communication session;
    generating, by the timekeeper server and based on the received information, an automated time entry upon termination of the communication session, wherein the automated time entry identifies the timekeeper, the client, a date of the communication session, and the duration; and
    generating, by the timekeeper server, a list of automated time entries for review by the timekeeper, wherein the list of automated time entries is provided to the timekeeper via the user interface on the first communication device.

2. The method of claim 1, wherein the duration of the communication session is determined by an amount of time elapsed during the communication session.

3. The method of claim 1, wherein the duration of the communication session is determined by a predetermined amount of time assigned based on the type of the communication session.

4. The method of claim 1, wherein the method further comprises:
    receiving a request for establishing the communication session between the first communication device and the second communication device, wherein the request for establishing the communication is generated from the first communication device via a practice management application accessible to the timekeeper on the first communication device.

5. The method of claim 4, wherein the practice management application is a downloadable application hosted on the first communication device.

6. The method of claim 4, wherein the practice management application is hosted remotely from the first communication device and the second communication device and accessed via an Internet browser.

7. The method of claim 1, wherein the method further comprises:
    receiving a request for establishing the communication session between the first communication device and the second communication device, wherein the request for establishing the communication is received from the second communication device; and
    forwarding the request to the first communication device for acceptance by the timekeeper, wherein acceptance of the request establishes the communication session.

8. An apparatus for generating automated time entries utilizing automated time capture, the apparatus comprising:
    a communications interface, executing on a first communication device operated by a timekeeper, that receives data from a network, the communications interface configured to receive a request from the timekeeper to initiate a communication session between the first communication device and a second communication device;
    memory, at a timekeeper server, storing instructions for generating the automated time entries based on the communication session between the first communication device and the second communication device; and
    a processor, at the timekeeper server, communicatively coupled via the network with the communications interface, and wherein the processor executes the instructions to:
        receive the request to initiate the communication session, wherein the request comprises identification information associated with the second communication device;
        determine, in response to a termination of the communication session, a duration of the communication session by automated time capture without further input from the timekeeper;
        generate an automated time entry upon termination of the communication session, wherein the automated time entry identifies the timekeeper, the client, a date of the communication session, and the duration; and
        generate a list of billable time entries for review by the timekeeper, wherein the list of billable time entries is provided to the timekeeper on one or more computing devices that includes the first communication device.

9. The apparatus of claim 8, wherein the instructions for determining the duration of the communication session includes further instructions to determine the duration of the communication session based on an amount of time elapsed during the communication session.

10. The apparatus of claim 8, wherein the instructions for determining the duration of the communication session includes further instructions to determine the duration of the communication session based on a predetermined amount of time assigned based on the type of the communication session.

11. The apparatus of claim 8, wherein the processor executes the instructions to:
    receive, from the first communication device, a request for establishing the communication session between the first communication device and the second communication device, wherein the request for establishing the communication is generated at a practice management application available to the timekeeper on the first communication device.

12. The apparatus of claim 11, wherein the practice management application is a downloadable application hosted on the first communication device.

13. The apparatus of claim 4, wherein the practice management application is hosted remotely from the first communication device and the second communication device and accessed via an Internet browser.

14. The apparatus of claim 9, wherein the processor executes the instructions to:
receive, from the second communication device, a request for establishing the communication session between the first communication device and the second communication device; and
forward the request to the first communication device for acceptance by the timekeeper, wherein acceptance of the request establishes the communication session.

15. A method for generating automated time entries utilizing automated time capture, the method comprising:
providing, to a timekeeper operating a first communication device, a user interface (UI) for establishing a communication session with a client operating a second communication device;
receiving, at the user interface, a request to initiate the communication session between the first communication device and the second communication device;
receiving, at a timekeeper server communicatively coupled to the first communication device, the request to initiate the communication session, wherein the request comprises identification information associated with the second communication device and the client operating the second communication device;
exchanging, with the user interface, data with the second communication device during the communication session, wherein a duration of the communication session is determined by automated time capture by the user interface without further input from the timekeeper;
receiving, at the timekeeper server from the user interface, information regarding the communication session, including the duration of the communication session; and
providing, by the timekeeper server to the user interface and based on the received information, a list of billable time entries for review by the timekeeper, wherein the list includes an automated time entry based on the communication session between the first communication device and the second communication device, and wherein the automated time entry identifies the timekeeper, the client, a date, and the duration of the interaction.

16. The method of claim 15, wherein the request is received on a practice management application available to the timekeeper on the first communication device.

17. The method of claim 16, wherein the practice management application is a downloadable application hosted on the first communication device.

18. The method of claim 16, wherein the practice management application is hosted remotely from the first communication device and the second communication device and accessed via an Internet browser.

19. The method of claim 15, wherein the request to initiate the communication session is received in response to a request to initiate the communication session generated at the second communication device.

20. The method of claim 15, wherein the data exchanged between the first communication device and the second communication device is passed through the timekeeper server, and wherein the timekeeper server identifies communication information for generating the automated time entries from the data.

* * * * *